| United States Patent [19] | [11] 3,772,113 |
| --- | --- |
| Patrick | [45] Nov. 13, 1973 |

[54] METHOD FOR SEALING RUPTURES IN PIPES OR VESSELS WHILE IN SERVICE WITH GASEOUS SUBSTANCES UNDER PRESSURE

[75] Inventor: Frank D. Patrick, Freeport, Tex.

[73] Assignee: The Dow Chemical Company, Midland, Mich.

[22] Filed: Feb. 10, 1972

[21] Appl. No.: 225,334

[52] U.S. Cl........................ 156/94, 117/94, 138/97, 138/99, 156/242, 156/245, 264/273
[51] Int. Cl............................................. B32g 35/00
[58] Field of Search ................. 117/94; 138/97, 99, 138/145; 156/94, 145, 242, 245; 264/271, 264/273, 36

[56] References Cited
UNITED STATES PATENTS

| 3,686,375 | 8/1972 | Hall .................................. 264/36 X |
| 3,288,171 | 11/1966 | Hucks ............................... 138/145 |
| 3,443,984 | 5/1969 | Stewart ........................... 138/145 X |
| 3,507,725 | 4/1970 | Hylak et al. .......................... 156/94 |

*Primary Examiner*—Edward G. Whitby
*Attorney*—William M. Yates et al.

[57] ABSTRACT

Ruptures in pipes or vessels while in service with gaseous substances under pressure are repaired by casting a rapid-setting urethane composition about a cleaned area surrounding the rupture.

5 Claims, No Drawings

METHOD FOR SEALING RUPTURES IN PIPES OR VESSELS WHILE IN SERVICE WITH GASEOUS SUBSTANCES UNDER PRESSURE

This invention relates to a method for repairing ruptures in pipes and vessels and more particularly it relates to a method for repairing such ruptures while the conduit is under pressure from gaseous substances.

Field repairs of ruptures in pipes or vessels and the like can now be prepared while in service under pressure of gaseous substances by the process of the present invention which comprises:

1. cleaning the surface of the pipe or vessel in an area surrounding the rupture,
2. sealing an enclosure having an opening therein for receiving a castable rapid-setting urethane composition about said pipe or vessel;
3. filling the cavity of the enclosure with a polyurethane composition which rapidly solidifies within about 5 minutes, preferably within about 3 minutes and most preferably within about 1 minute, after admixture of the components comprising said urethane composition thereby sealing the rupture so as to prevent the escape of the gaseous substance therefrom; wherein the gaseous substance contained in the pipe or vessel is non-reactive with said rapid-setting polyurethane composition and said vessel or conduit is subjected to a pressure by the gaseous substance of less than about 150 and preferably less than about 125 psig.

Suitable urethane composition which rapidly solidify without the addition of heat by external sources include those compositions comprising in intimate admixture:

A. a polyether polyol which is the adduct of a polyhydric initiator compound having a functionality of from 3 to about 8 with a vicinal epoxy compound, said polyol having a hydroxyl equivalent weight of at least aout 75 and less than about 230;
B. an organic polyisocyanate;
C. a liquid modifier compound having a boiling point above about 150° C at atmospheric pressure including for example hydroxyl-containing and non-hydroxyl-containing polyoxyalkylene compounds, ester-modified polyoxyalkylene compounds, fatty acids, naturally occurring fatty oils, organic phosphates, organic phosphites, organic phosphonates, cyclic ethers, non-ester-containing aromatic compounds, partially hydrogenated aromatic compounds, organic carbonates, halogenated aliphatic compounds, cyclic sulfones, esters of carboxylic acids, and mixtures thereof, and
D. a non-amine containing catalyst for urethane formation;

and wherein Components A and B are present in amounts so as to provide an NCO:OH ratio of from about 0.8:1 to about 2:1 and preferably from about 0.95:1 to about 1.1:1; Component C is present in quantities of from about 20–50 percent and preferably from about 30–50 percent by weight of the sum of Components A, B and C; and D is present in quantities of from about 0.2 to about 10 percent, preferably from about 0.2 to about 3 percent, and most preferably from about 0.5 to about 3 percent by weight of the sum of the weights of components A, B and C; with the proviso that when component C is a halogenated aliphatic compound, it is employed in a range of from about 0.2 to about 50 percent by weight of the sum of the weights of A, B and C, that when the halogenated aliphatic compound also contains hydroxyl groups and has an OH equivalent weight of less than about 500, it is employed in quantities of from about 0.2 to about 5 percent by weight based upon the sum of the weights of A, B and C, and that when component C is a non-ester-containing aromatic compound or a halogenated aliphatic compound, the non-amine-containing catalyst, component D, is employed in quantities of from about 0.01 to about 10 percent by weight of the combined weights of components A, B and C.

Suitable initiator compounds having from 3 to 8 hydroxyl groups which can be employed to prepare the polyols (component A) employed in the present invention include, for example, glycerine, trimethylolpropane, pentaerythritol, sorbitol, sucrose, mixtures thereof and the like.

Suitable vicinal epoxy compounds which may be reacted with the initiator compounds to prepare the polyols employed as component A in the present invention include, for example, the lower alkylene oxides and substituted alkylene oxides such as ethylene oxide, 1,2-propylene oxide, 1,2-butylene oxide, 2,3-butylene oxide, epichlorohydrin, epibromohydrin, epiodohydrin, styrene oxide, mixtures thereof and the like.

Suitable polyoxyalkylene compounds which may be employed as the liquid modified compound (component C) include, for example, 1. a liquid, totally-capped or non-hydroxyl-containing block or randomly formed polyoxyalkylene glycol represented by the general formula

I.

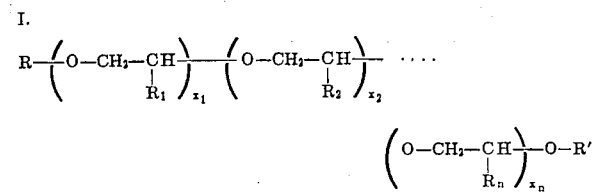

wherein R and R' are independently selected from saturated and unsaturated hydrocarbon groups having from about one to about six, preferably from about one to about three, carbon atoms; $R_1, R_2, \ldots$ and $R_n$ are independently hydrogen, an aryl group, an alkyl group or haloalkyl group, said alkyl or haloalkyl group having from about one to about two carbon atoms with the proviso that when $R_1, R_2 \ldots R_n$ is a haloalkyl group, it is present in minor amounts, i.e., a ratio of from about 0 to 10 percent of the total $R_1, R_2 \ldots R_n$ groups, and $x_1, x_2, \ldots x_n$ are integers, such that the boiling point of the liquid capped polyoxyalkylene glycol is above about 150° C;

2. a liquid partially capped, block or randomly formed polyoxyalkylene compound represented by the general formula

II.

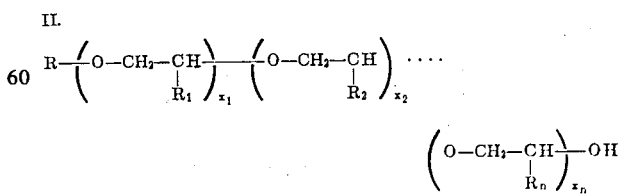

wherein R and $R_1, R_2 \ldots R_n$ are as defined in formula I above and $x_1, x_2, \ldots x_n$ are integers, the sum of which provides the partially capped polyoxyalkylene compound with a molecular weight of at least about 700;

3. a liquid, block or randomly formed polyoxyalkylene glycol represented by the general formula

III.

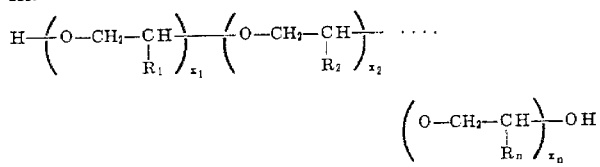

wherein $R_1, R_2 \ldots R_n$ are as defined in formula I above and $x_1, x_2 \ldots x_n$ are integers, the sum of which provides the polyoxyalkylene glycol with an equivalent weight of at least about 700, and 4. a liquid, random or block polyoxyalkylene polyol having a hydroxyl functionality of from 3 to about 8 represented by the general formula

IV.

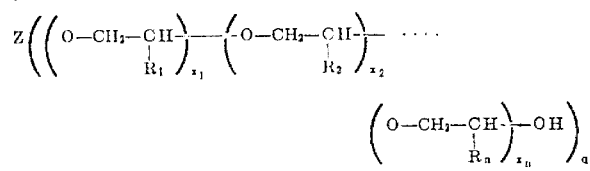

wherein $R_1, R_2 \ldots R_n$ are as defined in formula I above, Z is the residue of an initiator compound having from three to about eight hydroxyl groups, $x_1, x_2, \ldots x_n$ are integers, the sum of which provides the polyoxyalkylene polyol with a hydroxyl equivalent weight of at least about 500 and $q$ is an integer having a value of from 3 to about 8.

Suitable ester-modified polyoxyalkylene compounds which may be employed as the liquid modifier compound (component C) include, for example, those liquid ester-modified polyethers having a boiling point above about 150° C represented by the general formula

V.

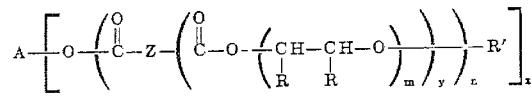

wherein A is the residue of an initiator or starting compound having from one to about eight hydroxyl groups, Z is the residue, excluding the carboxyl groups, of an internal anhydride of a saturated or unsaturated acyclic aliphatic, a saturated or unsaturated cyclic aliphatic, or aromatic polycarboxylic acid, halogenated derivatives thereof and mixtures thereof, each R is a substituent independently selected from hydrogen atoms, an alkyl radical having from one to 20 carbon atoms, a halomethyl radical, a phenyl radical, and a phenoxymethyl radical, an alkoxymethyl radical with the proviso that one of the R substituents must be hydrogen, R' is hydrogen or a saturated or unsaturated aliphatic group having from one to 20 carbon atoms, m has an average value of from about 1.0 to about 2.0, n has a value from about one to about five, x has a value from about one to about eight and y has a value of one or two and wherein said ester-modified polyether compound has a hydroxyl equivalent weight above about 500 when three or more hydroxyl groups are present and when two hydroxyl groups are present, an average equivalent weight of above about 700 and when zero or one hydroxyl group is present a molecular weight of above about 700.

Suitable initiators which may be employed to prepare the liquid polyoxyalkylene and ester-modified polyoxyalkylene modifier compounds (component C) of the present invention include compounds having from one to about eight hydroxyl groups such as, for example, methanol, ethanol, propanol, butanol, ethylene glycol, propylene glycol, butylene glycol, 1,6-hexane diol, glycerine, trimethylolpropane, pentaerythritol, sorbitol, sucrose, mixtures thereof and the like.

When the liquid modifier compound, component C, is an ester modified polyether polyol, the initiator compound may also be and is preferably an adduct of the above mentioned initiator compounds and one or more of the following vicinal epoxide-containing compounds, i.e., the initiator compound is a polyoxyalkylene compound having one to eight hydroxyl groups, preferably two to about three or four hydroxyl groups.

Suitable vicinal epoxide compounds which may be reacted with the above mentioned initiator compounds to prepare the modifier compounds (component C) employed in the present invention include, for example, ethylene oxide, 1,2-propylene oxide, 1,2-butylene oxide, 2,3-butylene oxide, epichlorohydrin, epibromohydrin, epiodohydrin, styrene oxide, mixtures thereof and the like.

The liqiuid modifier compounds represented by formulae I–IV and methods for their preparation are well known in the art, e.g. U.S. Pat. No. 2,448,664; U.S. Pat. No. 2,425,755; U.S. Pat. No. 2,782,240 and U.S. Pat. No. 2,520,611. Methods for the preparation of the liquid modifier compounds represented by the formula V are given in a copending U.S. Pat. application Ser. No. 67,233, filed Aug. 26, 1970 by Robert W. McAda, Jr. for "ESTER-MODIFIED POLYETHER POLYOLS" and in U.S. Pat. No. 3,502,601.

Suitable esters of a carboxylic acid which are employed as component (C) in the present invention include those esters prepared from mono- and polycarboxylic acids having from about one to about 20 carbon atoms such as for example, phthalic, adipic, acetoacetic, formic, acetic, abietic, acids, and the like and wherein the ester portion contains from about one to about 20 carbon atoms such as methyl, ethyl, propyl, butyl, hexyl, cyclohexyl, octyl, decyl, dodecyl, eicosyl and the like so long as the carboxylic acid ester has a boiling point above about 150° C and is a liquid at room temperature.

These acid esters can be prepared by condensing an acid having from about one to about 20 carbon atoms with a saturated or unsaturated aliphatic alcohol having from about one to about 20 carbon atoms, with the proviso that the ester product is a liquid and has a b.p. >150° C.

Suitable aromatic compounds which are employed as the liquid modifier compound having a boiling point above about 150° C 150° C (component C) in the present invention include, for example, straight and branch chain aliphatic, alkoxy and halogen substituted benzenes, aromatic substituted benzene and aromatic ethers, such as, for example, propenyl benzene, propylbenzene, butylbenzene, ethyltoluene, butyltoluene, propyltoluene, diphenyl oxide, biphenyl, o-, m- and-pdiethyl-benzene, dodecylbenzene, octadecylbenzene, bromobenzene, 1-bromo-3-chlorobenzene, 1-bromo-4- fluorobenzene, 1-bromo-2-iodobenzene, 1-bromo-3-iodobenzene, 1-chloro-4-fluorobenzene, o-dibromobenzene, m-dibromobenzene, o-dichlorobenzene, m-dichlorobenzene, 1,3-dipropoxybenzene, 1-ethyl-4-propylbenzene, 1-fluoro-4-iodobenzene, 4-bromo-o-xylene, α-bromo-m-xylene, 4-bromo-m-xylene, α-chloro-m-xylene, 4-ethyl-m-xylene, 5-ethyl-m-xylene, 2-bromo-p-xylene, α-chloro-p-xylene, 2-ethyl-p-xylene, 2-ethyl-p-xylene, o-bromotoluene, m-bromo-toluene, o-, m-, and -pchlorotoluene, tertiary butylstyrene, α-bromostyrene, β-bromostyrene, α-chlorostyrene, β-chlorostyrene, mixtures thereof and the like.

The above compounds are represented by the following general formula provided it is understood that such compounds represented by the formula are liquids and have boiling points at atmospheric pressure above about 150° C.

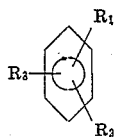

wherein $R_1$, $R_2$ and $R_3$ are independently selected from an alkyl group having from about one to about 18 carbon atoms, an alkenyl group having from two to about three carbon atoms, a halogen, an alkoxy group, an aromatic group and hydrogen.

Other suitable aromatic compounds which are employed as the liquid modifier compound (component C) in the present invention include liquid multi-ring compounds having a boiling point above about 150° C such as, for example, 1-chloro-naphthalene, 1-bromo-naphthalene, mixtures thereof and the like.

Suitable partially hydrogenated multi-ring aromatic compounds which are employed as the liquid modifier compound (component C) in the present invention include, for example, 1,4-dihydronaphthalene, 1,2,3,4-tetrahydronaphthalene, mixtures thereof and the like.

Suitable organophosphorus compound which are employed as the liquid modifier compound, component C, include, for example, organo phosphates, organo phosphites and organo phosphonates having boiling points above about 150° C.

Organo phosphates, phosphites and phosphonates which are employed as the liquid modifier compound include those liquid compounds represented by the formulae

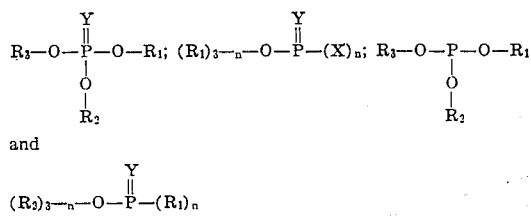

wherein $R_1$, $R_2$ and $R_3$ are independently selected from the group consisting of alkyl, alkoxyaryl, aryloxyaryl, alkaryl, aralkyl groups and halogen substituted derivatives thereof. Y is oxygen or sulfur, X is a halogen, i.e., chlorine, fluorine, bromine or iodine, n has a value of one or two. Suitable such compounds include, for example, tri-n-butyl phosphate, triethylphosphate, tricresylphosphate, tris-(beta-chloroethyl)phosphate, tri-s-(2,3-dibromopropyl)phosphate, butyl dichlorophosphate, 2-chloroethyl dichlorophosphate, ethyl dichlorophosphate, diethyl fluorophosphate, bis(2-chloroethyl) fluorophosphate, dibutyl chlorophosphate, isoamyl dichlorothionophosphate, ethyl dibromothiophosphate, 2-chlorophenyl dichlorophosphate, 2-methoxyphenyl dichlorophosphate, 2-phenoxyphenyl dichlorophosphate, 2-chloroethyl dichlorophosphite, tris(2-chloroethyl)phosphite, tributyl phosphite, tricresyl phosphite, triethyl phosphite, diethyl isoamylphosphonate, diethyl ethylphosphonate, dimethyl methylphosphonate, diethyl methylphosphonate, diisobutyl isobutylphosphonate, bis(2-bromopropyl)-2-bromopropane phosphonate.

The organo phosphorus compounds can be prepared by procedures described in ORGANO-PHOSPHORUS COMPOUNDS, G. M. Kosolapoff, John Wiley & Sons, Inc., 1950.

Suitable liquid organic carbonates which are employed as the liquid modifier, component C, in the present invention include the acyclic and cyclic carbonates represented by the formulae

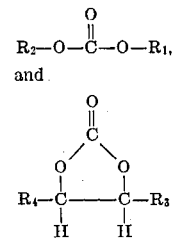

wherein each $R_1$ and $R_2$ are independently aryl, alkyl (having from about one to about six carbom atoms) or alkenyl groups (having from about one to about six carbon atoms) and substituted derivatives thereof and each $R_3$ and $R_4$ are selected from the same groups as $R_1$ and $R_2$ and hydrogen.

Suitable liquid acyclic organic carbonates which are employed in the present invention include, for example, bis(2-chloroethyl carbonate), di-n-butyl carbonate, butyldiglycol carbonate, cresyldiglycol carbonate, dibutyl carbonate, di-2-ethylhexyl carbonate, dimethallyl carbonate, dinonyl carbonate and the like. The organic acyclic carbonate may be prepared by procedures given in U.S. Pat. No. 2,687,425.

Suitable liquid cyclic organic carbonates include, for example, propylene carbonate, butylene carbonate, styrene carbonate, mixtures thereof and the like. The cyclic organic carbonates may be prepared in the manner described in Canadian Pat. No. 556,006.

Suitable cyclic polyethers which are employed as the liquid modifier (component C) include, for example, the cyclic tetramer of ethylene oxide, cyclic pentamer of propylene oxide, cyclic tetramer of propylene oxide, mixtures of the above and mixtures of cyclic pentamers and above of ethylene oxide and or propylene oxide. Any liquid cyclic polyether having a boiling point above 150° C can be employed as the liquid modifier in the present invention including cyclic polyethers prepared from butylene oxide, epichlorohydrin and the like.

The liquid cyclic polyether modifier compounds can be prepared by procedures mentioned in "Cyclic Polyethers and Their Complexes with Metal Salts" by C. J. Pedersen, J. Am. Chem. Soc., Vol. 89, p. 7,017–7,036, 1968, "Twelve-Membered Polyether Rings. The Cyclic Tetramers of Some Olefin Oxides" by R. S. Kern; J. Org. Chem., Vol. 33, p. 388–390, 1968; British Pat. Nos. 785,229 and 1,108,921.

Suitable chlorinated aliphatic compounds having a boiling point above about 150° C which are employed as the modifier compound in the present invention include, for example, such chlorinated aliphatic compounds as hexachlorobutadiene, tetrachlorobutadiene, 1,2,3,3-tetrachlorobutane, 1,2,3-trichloropropene, polyepichlorohydrin diol having an equivalent weight above about 700 up to about 4,000, chlorinated paraffins, e.g. "Chlorowax" No. 40, 1-mercapto-3-chloropropanol-2, 3-chloropropane-1,2-diol, 2-chloropropane, 1,3-diol, 1,3-dichloro-2-propanol, mixtures thereof and the like.

Suitable cyclic sulfones which are employed as the liquid modifier compound include the 5-membered cyclic sulfones such as, for example, 3-methylsulfolane (3-methyltetrahydrothiophene-1,1-dioxide) and the like.

The term "liquid modifier boiling above about 150° C" includes eutectic mixtures of the previously described classes of compounds which are solids at atmospheric pressure but said eutectic mixtures are a liquid at room temperature and atmospheric pressure which have boiling points above about 150° C. Also included in the definition are those solid compounds of the classes previously described which are dissolved in a liquid member of any of the described classes of compounds having boiling points above about 150° C wherein the resultant solution is a liquid at standard conditions of temperature and pressure and have boiling points at atmospheric pressure above about 150° C.

Other components including inert fillers such as, for example, sand, microballoons, glass fibers, asbestos, aluminum granules, silicon carbide powder and the like, coloring agents, such as pigments and dyes including, for example, chromic oxide, ferric oxide, mixtures thereof and the like may be employed in the compositions of the present invention without detracting from the scope thereof.

Suitable organic polyisocyanates which are employed as component B in the present invention include, for example, any organic polyisocyanate having two or more NCO groups per molecule and no other substituents capable of reacting with the hydroxyl groups of the amine initiated polyoxyalkylene compounds employed as component A or the hydroxyl containing compounds employed as component C. Suitable such polyisocyanates include, for example, 2,4-toluenediisocyanate, 2,6-toluenediisocyanate, hexamethylene diisocyanate, p,p'-diphenylmethanediisocyanate, p-phenylenediisocyanate, hydrogenated methylene diphenyldiisocyanate (e.g. Hylene W) naphthalene diisocyanate, dianisidine diisocyanate, polymethylene polyphenyl-isocyanate, mixtures of one or more polyisocyanates and the like.

Other organic isocyanates which are suitably employed and which are to be included in the term organic polyisocyanate include isocyanate terminated prepolymers prepared from the previously mentioned polyols and the above mentioned isocyanates.

Suitable non-amine-containing catalysts for urethane formation which are employed as component D herein include, for example, organo-metal compounds of tin, zinc, lead, mercury, cadimum, bismuth, cobalt, manganese, antimony, iron and the like such as, for example, metal salts of a carboxylic acid having from about two to about 20 carbon atoms including, for example, stannous octoate, dibutyltin dilaurate, dibutyltin diacetate, ferric acetylacetonate, lead octoate, lead oleate, phenylmercuric propionate, cobalt naphthenate, lead naphthenate, mixtures thereof and the like.

It is preferred that the catalysts be employed in liquid form. Those catalysts which are not ordinarily liquids may be added as a solution in a solvent which is compatible with the other components employed in the composition of the present invention. Suitable such solvents include, for example, dioctylphthalate, polyoxyalkylene glycols, mineral spirits, dipropylene glycol, mixtures thereof and the like.

It has previously been stated that the quantity of the non-amine-containing catalyst is in the range of from about 0.2 to about 10 percent. However, when the liquid modifier compound is a non-ester-containing aromatic compound or a halogenated aliphatic compound as described herein, the operable range for the quantity of the catalyst to be employed is from about 0.01 to about 10 percent and preferably from about 0.05 to about 2 percent and most preferably from about 0.1 to about 0.5 percent by weight based upon the combined weights of components A, B and C.

The surfaces of the pipes or vessels can be cleaned by any suitable means such as by solvents, sandpapering or sandblasting, water washing followed by drying and the like.

In some instances it is desirable to apply an adhesive to the area surrounding the rupture and partially curing the same before applying the rapid setting urethane composition.

Suitable adhesives include catalyzed polyepoxide compositions of which are well known in the art, e.g. *Handbook of Epoxy Resins* by Lee and Venible, McGraw-Hill Book Co., 1967.

The pipes and vessels for which the field repair method of the present invention can be employed include those pipes and vessels constructed of reinforced plastic such as vinyl ester resins, polyester resins, epoxy resins and the like, metals such as copper, steel, aluminum and the like, and glass.

The following example is illustrative of the present invention but is not to be construed as to limiting the scope thereof in any manner.

EXAMPLE 1

The area surrounding the rupture of a fiberglass reinforced plastic pipe carrying 100 psig nitrogen was cleaned by means of hand sandpapering and subsequently washing with water to remove dust particles and followed by drying. To the thus sanded surface was applied an adhesive layer consisting of asbestos and silica filled epoxy novolac resin having an EEW of about 176–181 and an average epoxy functionality of about 3.2 containing a stoichiometric quantity of triethylene tetramine. The adhesive layer was approximately 0.015 inches thick and was allowed to set for about 45 minutes during which time an enclosure, i.e., a cardboard box, having an opening therein was sealed about the area surrounding the rupture and extending about 2 inches in all directions from the edges of said rupture with masking tape and Dow Corning Silastic 732 sealant.

Then a rapid-setting urethane composition consisting of:

Part A. a mixture of
141 parts of a prepolymer having 30 percent free NCO groups prepared from toluene diisocyanate and the reaction product of glycerine with propylene oxide in a molar ratio of about 1:3 respectively, and
131 parts of dioctylphthalate; and Part B. a mixture of the reaction product of glycerine and propylene oxide in a molar ratio of about 1:3 respectively and about 1 percent by weight of stannous octoate catalyst;

was prepared by mixing three parts by weight of Part A with one part by weight of Part B for about 15 seconds.

Immediately upon completion of the mixing, the composition was poured into the cavity formed by the enclosure surrounding the rupture. Nitrogen gas bubbled up through the mixture for about 30–45 seconds after which the bubbling stopped and the polyurethane composition instantly solidified thereby sealing off the escape of nitrogen from the pipe.

I claim:

1. A method for sealing ruptures in pipes or vessels while in service of carrying or holding gaseous substances under a pressure of less than about 150 psig which comprises:
   1. cleaning the surface of the pipe or vessel in an area surrounding the rupture,
   2. sealing an enclosure having an opening therein for receiving a castable rapid-setting urethane composition about said pipe or vessel;
   3. filling the cavity of the enclosure with a urethane composition which rapidly solidifies within about 5 minutes, after admixture of the components comprising said urethane composition;

thereby sealing the rupture so as to prevent the escape of the gaseous substance therefrom.

2. The method of claim 1 wherein an adhesive layer is applied to the cleaned area surrounding the rupture in said pipe or vessel after cleaning said area surrounding said rupture.

3. The method of claim 2 wherein the pipe or vessel is under a pressure of less than about 125 psig.

4. The method of claim 3 wherein said rapid-setting urethane composition solidifies within 1 minute after the components comprising said composition are admixed.

5. The method of claim 4 wherein said pipe or vessel is constructed of a reinforced thermoset epoxy resin.

* * * * *

UNITED STATES PATENT OFFICE
CERTIFICATE OF CORRECTION

Patent No. U.S. 3,772,113    Dated Nov. 13, 1973

Inventor(s) Frank D. Patrick

It is certified that error appears in the above-identified patent and that said Letters Patent are hereby corrected as shown below:

Col. 1, l. 30, change "composition" to --compositions--.

Col. 1, l. 37, change "aout" to --about--.

Col. 2, l. 26, change "modified" to --modifier--.

Col. 4, l. 60, delete one occurrence of "150°C".

Col. 7, l. 54, after "Hylene" insert --®--.

Col. 8, l. 36, change "Venible" to --Neville--.

Signed and sealed this 18th day of February 1975.

(SEAL)
Attest:

RUTH C. MASON
Attesting Officer

C. MARSHALL DANN
Commissioner of Patents
and Trademarks